United States Patent [19]

Singer et al.

[11] Patent Number: 4,690,980
[45] Date of Patent: Sep. 1, 1987

[54] ACRYLIC MODIFIED POLYMERS

[75] Inventors: Debra L. Singer, Pittsburgh; William J. Birkmeyer, Oakmont; Rostyslaw Dowbenko, Gibsonia; Charles M. Kania, Tarentum, all of Pa.

[73] Assignee: PPG Industries, Inc., Pittsburgh, Pa.

[21] Appl. No.: 864,579

[22] Filed: May 20, 1986

Related U.S. Application Data

[63] Continuation of Ser. No. 755,995, Jul. 17, 1985, abandoned.

[51] Int. Cl.$^4$ .......................................... C08F 265/02
[52] U.S. Cl. .................................................. 525/286
[58] Field of Search ......................................... 525/286

[56] References Cited

U.S. PATENT DOCUMENTS 4,033,920  7/1977  Isozaki .......................... 260/29.6 H
4,064,087 12/1977  Das ..................................... 525/286
4,304,701 12/1981  Das ..................................... 525/286

Primary Examiner—Paul R. Michl
Attorney, Agent, or Firm—Linda Pingitore

[57] ABSTRACT

A liquid, ungelled composition of matter composed of a graft copolymer prepared by the free radical initiated polymerization in an organic medium of a vinyl monomer component which contains at least 0.5 weight percent of an epoxy group containing vinyl monomer in the presence of an acid group containing polymer having an acid value greater than 10 mg KOH/g. One means of graft formation is the condensation reaction between the acid groups of the acid group containing polymer and the epoxy groups of the vinyl monomer component.

19 Claims, No Drawings

ACRYLIC MODIFIED POLYMERS

This application is a continuation of application Ser. No. 755,995, filed July 17, 1985, abandoned.

BACKGROUND OF THE INVENTION

The present invention relates to acrylic modified polymers.

It has been known to prepare acrylic modified alkyd resins or polyester resins which have some proportion of unsaturation in their backbone by reacting the acrylic monomer across this backbone unsaturation. U.S. Pat. No. 2,890,185 is exemplary of this type of modification. This method can be disadvantageous in some circumstances because it depends upon the unsaturation in the polymeric backbone. There is a need, therefore, for a method of preparing acrylic modified polymers which does not depend solely upon polymer backbone unsaturation.

SUMMARY OF THE INVENTION

In accordance with the present invention there is provided a liquid, ungelled composition of matter which comprises a graft copolymer prepared by the free radical initiated polymerization in an organic medium of a vinyl monomer component which contains at least 0.5 weight percent of an epoxy group containing vinyl monomer in the presence of an acid group containing polymer having an acid value greater than 10 milligrams KOH/gram, at least one means of graft formation being the condensation reaction between the acid groups of the acid group containing polymer and the epoxy groups of the vinyl monomer component. Also provided is a process for preparing the liquid, ungelled compositions of the invention.

DETAILED DESCRIPTION OF THE INVENTION

The liquid, ungelled compositions of matter of the present invention, broadly stated, comprise the free radical initiated polymerization reaction product of a vinyl monomer component and an acid group containing polymer.

The vinyl monomer component contains at least 0.5 weight percent, preferably at least 1 weight percent, more preferably at least 2 weight percent, of an epoxy group containing vinyl monomer. Examples of such monomers include glycidyl acrylate, glycidyl methacrylate, allyl glycidyl ether, methallyl glycidyl ether and glycidyl esters of polymerizable polycarboxylic acids such as maleic acid, fumaric acid, and crotonic acid. Preferably the epoxy group containing vinyl monomer is glycidyl methacrylate. The vinyl monomer component preferably contains from about 2 percent to about 100 percent of epoxy group containing vinyl monomer. The vinyl monomer component can also comprise at least one other copolymerizable ethylenically unsaturated monomer. Exemplary of suitable ethylenically unsaturated monomers include styrene; alkyl esters of acrylic or mthacrylic acid such as methyl (meth)acrylate, ethyl (meth)acrylate, or butyl (meth)acrylate; acrylic acid; and methacrylic acid. Typically, a mixture of such vinyl monomers is utilized. The vinyl monomer component is generally present in an amount ranging from about 10 weight percent to about 90 weight percent, preferably 30 to 80 weight percent.

In one embodiment of the present invention a portion of the vinyl monomer component is made up of an ester of a bicyclic alcohol and an unsaturated acid such as acrylic acid or methacrylic acid. Preferably the bicyclic alcohol is isobornyl alcohol and the acid is methacrylic acid, i.e., isobornyl methacrylate. The isobornyl methacrylate can be utilized in amounts ranging from about 2 percent by weight to about 25 percent by weight based on the total weight of the vinyl monomer component. Preferably the amount utilized ranges from about 5 percent to about 15 percent by weight. The isobornyl methacrylate contributes to increasing the gloss and generally improving the appearance of cured films formed from ungelled compositions prepared with this monomer.

The liquid, ungelled compositions of the present invention are also prepared with an acid group containing polymer having an acid value greater than 10 mg KOH/g. Acid group containing polymers having acid values less than 10 mg KOH/g are not preferred because they tend to result in final cured films with diminished physical properties such as solvent and chemical resistance, hardness and exterior durability. Preferably the polymer has an acid value greater than 15 mg KOH/g.

Examples of the acid group containing polymer include saturated oil-free polyester polymers, unsaturated oil-free polyester polymers, alkyd polymers, polyurethane polymers, urethane modified oil-free polyesters, urethane modified alkyds, and epoxy-esters. As was stated above, a fundamental feature of the present invention is that the polymer have an acid value of greater than 10 mg KOH/g. The weight average molecular weight of the acid group containing polymer can vary widely although preferably the weight average molecular weight is at least 300 as determined by gel permeation chromatography using a polystyrene standard.

Saturated or unsaturated oil-free polyester polymers can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, propylene glycol, neopentyl glycol and other glycols such as hydrogenated Bisphenol A, cyclohexanediol, cyclohexanedimethanol, polycaprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used, although diols are preferred. Examples include trimethylolpropane, trimethylolethane, pentaerythritol and the like, as well as higher molecular weight polyols such as those produced by oxyalkylating lower molecular weight polyols.

The acid component of the polyester consists primarily of dibasic carboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types, for example, Diels-Alder adducts of unsaturated $C_{18}$ fatty acids such as the product sold by West-Vaco Company under the trademark DIMER ACID. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used. When an unsaturated oil-free polyester is desired, the acid component of the polyester should be selected such that at least a portion is an ethylenically unsaturated polycarboxylic acid or anhydride thereof, where they exist, such as maleic acid, fumaric acid, itaconic acid, mesaconic acid, ethyl maleic acid, or mixtures thereof. As has been mentioned above, the polyester is prepared such that it contains an acid value of at least 10 mg. KOH/g.

In addition to the aforedescribed polyester polymers, polyurethanes can also be used. These polymers can be prepared by reacting any of a variety of polymers containing some hydroxyl functionality such as polyester polyols with an organic polyisocyanate. The polymer is prepared by art-recognized procedures so that it has the requisite acid value.

The organic polyisocyanate which is used in preparing the polyurethane polymers can also be used to react with the oil-free polyester to form the resultant urethane-modified polymer.

The organic polyisocyanate can be an aliphatic polyisocyanate, including a cycloaliphatic polyisocyanate or an aromatic polyisocyanate; preferably a diisocyanate is employed. Useful aliphatic diisocyanates include ethylene diisocyanate, 1,2-diisocyanatopropane, 1,3-diisocyanatopropane, 1,6-diisocyanatohexane, 1,4-butylene diisocyanate, 1,6-hexamethylene diisocyanate, lysine diisocyanate, 1,4-methylene bis(cyclohexylisocyanate) and isophorone diisocyanate. Useful aromatic diisocyanates include the various isomers of toluene diisocyanate, metaxylenediisocyanate, and para-xylenediisocyanate, also 4-chloro-1,3-phenylenediisocyanate, 1,5-tetrahydronaphthalenediisocyanate, 4,4'-dibenzyl diisocyanate, and 1,2,4-benzene triisocyanate can be used. In addition the various isomers of alpha,alpha,alpha',alpha'-tetramethyl xylene diisocyanate can be used.

The alkyd resins useful herein are polyesters of polyhydroxyl alcohols and polycarboxylic acids chemically combined with various drying, semi-drying and non-drying oils or fatty acids in different proportions. Thus, for example, the alkyd resins are made from polycarboxylic acids such as phthalic acid, maleic acid, fumaric acid, isophthalic acid, succinic acid, adipic acid, azelaic acid, sebacic acid as well as from anhydrides of such acids, where they exist. The polyhydric alcohols which are reacted with the polycarboxylic acid include glycerol, trimethylolethane, trimethylolpropane, pentaerythritol, sorbitol, mannitol, ethylene glycol, diethylene glycol and 1,3-butanediol.

The alkyd resins are produced by reacting the polycarboxylic acid and the polyhydric alcohol together with a drying, semi-drying or non-drying oil or fatty acid in proportions depending upon the properties desired. The oils or fatty acids are coupled into the resin by esterification during the manufacturing and become an integral part of the polymer. The oil or fatty acid can be fully saturated or predominately unsaturated. The fully saturated oils or acids tend to give a plasticizing effect to the alkyd, whereas the predominately unsaturated oils or fatty acids tend to crosslink and dry rapidly with oxidation to give tougher alkyd resins. Suitable oils include coconut oil, fish oil, linseed oil, tung oil, castor oil, cottonseed oil, safflower oil, or soybean oil. Fatty acids can be derived from the above oils or tall oil. Examples of fatty acids include those derived from the oils by known processes such as fatty acids having 4 to 22 carbon atoms and a terminal carboxyl group, e.g., octanoic acid, decanoic acid, dodecanoic acid and hexadecanoic acid. Various proportions of the polycarboxylic acid, polyhydric alcohol, oil, or fatty acid are used to obtain alkyd resins of various properties.

The alkyd resins can also be modified with an organic polyisocyanate as has been described above, by art recognized methods, to form a urethane-modified polymer.

Epoxy esters can be prepared, for example, by chain extending some of the acid groups on an acid functional polyester with an epoxide containing material such as epoxidized soybean oil. Also useful are epoxy esters prepared from fatty acids such as those listed above and the diglycidyl ether of Bisphenol A.

Preferably, an acid group containing alkyd polymer is utilized as the acid group containing polymer in preparing the liquid ungelled composition of the present invention.

In one preferred embodiment the liquid ungelled composition of the present invention can be made water dispersible. This can be achieved by including as a portion of the vinyl monomer component sufficient acrylic acid or methacrylic acid so that the liquid ungelled reaction product as prepared has an acid number of at least 25, preferably at least 30, and more preferably at least 40. The acid groups are then neutralized with a base, such as ammonia or various amines, to permit dispersion into water.

The liquid ungelled composition of the present invention can be prepared in a variety of ways, for example, with excess hydroxyl functionality, excess acid functionality or excess epoxy functionality depending upon the particular choice of vinyl monomers for the vinyl monomer component and the amount of epoxy group containing vinyl monomer used with respect to the acid value of the acid group containing polymer. As a result, the claimed liquid ungelled compositions can be formulated into a variety of coating compositions curable by different curing agents. For example, the hydroxyl functional compositions can, of course, be cured with aminoplast or polyisocyanate curing agents; and the epoxy functional compositions can be cured with an amine type curing agent such as those commercially available from Jefferson Chemical Company under the designation JEFFAMINE. This is extremely advantageous because the liquid ungelled composition can be tailored to suit a variety of uses.

The preparation of the liquid ungelled composition is generally conducted in the presence of a free radical initiator for the vinyl addition polymerization which occurs. Suitable initiators include t-butyl perbenzoate, t-butyl perisobutyrate, azobis(isobutyronitrile), di-t-butyl peroxide, t-butyl peracetate, and t-amyl perbenzoate. The amount of free radical initiator will vary widely, however, typically ranges from about 0.1 percent by weight to about 10 percent by weight based on the vinyl monomer component. The polymerization is typically conducted at a temperature of 125° C. to 150°

C. and usually under an inert atmosphere such as nitrogen.

The liquid, ungelled composition of the present invention can be used per se as a thermoplastic coating composition or alternatively the liquid, ungelled composition can be formulated into a thermosetting composition by combining it with a curing agent adapted to cure the composition as has been mentioned above. Suitable curing agents include, for example, aminoplasts and polyisocyanates including blocked isocyanates. These curing agents are detailed below. Alternatively, in an embodiment which utilizes an alkyd which has been prepared from an unsaturated oil or fatty acid as the acid group containing polymer one can cure the liquid ungelled composition by air oxidation.

It has been observed that the liquid, ungelled compositions of the present invention, in which the vinyl addition polymerization of the vinyl monomer component to form vinyl polymer has been performed in the presence of the acid group containing polymer, when formulated into coating compositions result in clear dried films. These compositions are advantageous over compositions formulated from blends of acid group containing polymers with epoxy group containing vinyl polymers. Simple blends of such materials are, of course, incompatible and they result in dried films which are hazy. It is believed that the haziness is indicative of a non-uniform composition and poor grafting. Even when such blends are heated to allow the acid and epoxy groups to react until a low acid value is achieved, the components are still incompatible and the resultant product still produces a hazy film. The good film clarity of the claimed compositions, on the other hand, is indicative of a uniform composition and a suitable degree of grafting.

By grafting is meant not only the vinyl addition polymerization between the unsaturation present in the vinyl polymer formed from the vinyl monomer component and the unsaturation which may be present in the acid group containing polymer backbone, but also the condensation between the acid groups present on the acid group containing polymer and the epoxide groups of the vinyl polymer. Since the preparation of the ungelled compositions of the present invention does not depend solely upon the unsaturation present in the acid group containing polymer, one has considerable latitude in the choice of backbone acid functional polymer. Indeed, as has been discussed in the section dealing with the acid group containing polymers, one can select such a polymer which is fully saturated. In these circumstances grafting will occur through the acid and epoxy condensation reaction. Thus, a variety of ungelled compositions can be prepared which provide numerous advantageous film properties.

Of the suitable curing agents, aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, ethylene diurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl aldehyde may be used.

The aminoplast contains methylol or similar alkylol groups and preferably at least a portion of these alkylol groups are etherified by reaction with an alcohol to help provide organic solvent-soluble resins. Any monohydric alcohol can be employed for this purpose including such alcohols as methanol, ethanol, butanol and hexanol.

Preferably, the aminoplasts which are used are melamine, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanates such as those mentioned above with polyester of polyether polyols. Particularly useful isocyanates are the isocyanurate from isophorone isocyanate commercially available from Veba Company as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

Coating compositions prepared from the liquid, ungelled compositions of the present invention have excellent film properties such as hardness, solvent and chemical resistance, and exterior durability and they can be formulated into coating compositions for a variety of uses depending upon the choice of acid group containing polymer. Typically, a cure promoting catalyst is utilized in conjunction with an aminoplast curing agent, for example acid catalysts such as para-toluenesulfonic acid and blocked forms of these acids.

In addition, the compositions of the present invention may contain a variety of other optional ingredients including pigments, fillers, plasticizers, antioxidants, surfactants and flow control agents.

The compositions can be applied by any conventional method including spraying, brushing, dipping and flow coating. Also, the compositions can be applied over a variety of substrates including metals and glass.

The following Examples are only illustrative of the invention and are not intended to limit it to their details.

EXAMPLE I

| Preparation of Alkyd-Acrylic Copolymer | | |
|---|---|---|
| Charge | Ingredients | Parts by Weight grams |
| I | alkyd[1] | 376.5 |
| | xylene | 260.7 |
| II | glycidyl methacrylate | 32.0 |
| | methyl methacrylate | 224.0 |
| | butyl methacrylate | 224.0 |
| | xylene | 10.0 |
| III | tert-butyl perbenzoate | 8.0 |
| | xylene | 70.0 |
| IV | tert-butyl perbenzoate | 4.0 |
| | xylene | 40.0 |

[1]This alkyd was prepared in the following manner:
A reactor vessel was equipped with mechanical stirrer, thermometer, nitrogen inlet tube and set up for azeotropic reflux. The vessel was charged with 1,500 parts by weight of PAMOLYN 300 (one of a family of synthetically conjugated linoleic acids which are commercially available from Hercules, Inc.); 772 parts by weight of trimethylolpropane; 450 parts by weight of benzoic acid; 502 parts by weight of phthalic anhydride and 90 parts by weight of xylene and heated to a temperature of 225° C. to 230° C. with reflux. The reaction mixture was held at this temperature until an acid value within the range of 20 to 24 was obtained. The reaction product was thinned to a total solids content of 85 percent with xylene. The final acid value was 20.6.

The copolymer was then prepared as follows: A suitably equipped reactor vessel was charged with (I), placed under nitrogen atmosphere and heated to a gentle reflux. Subsequently, charges (II) and (III) were added together, (II) over a period of two hours and (III) over a period of two and one-half hours. The reaction mixture was maintained at reflux for one hour and then charge (IV) was added over a period of thirty minutes. The reaction mixture was again maintained at reflux for one hour and then allowed to cool to room temperature. The resultant alkyd-acrylic copolymer had an acid value of 2.5.

EXAMPLE II

In this Example, the alkyd-acrylic copolymer of Example I was formulated into a coating composition and evaluated as set out below.

| Ingredients | Parts by Weight grams |
|---|---|
| alkyd-acrylic copolymer[2] | 96.34 |
| nitrocellulose | 41.32 |
| CYMEL 327[3] | 5.33 |
| methyl isobutyl ketone | 32.0 |
| butyl acetate | 94.0 |
| methyl amyl ketone | 17.0 |
| silicone flow agent[4] | 0.6 |
| silicone mar agent[5] | 0.3 |
| methyl ethyl ketoxime | 0.3 |

[2]Prepared in Example I, above.
[3]This butylated melamine-formaldehyde crosslinking agent is commercially available from American Cyanamid.
[4]Commercially available from Dow Corning as DC200.
[5]Commercially available from Byk-Mallinkrodt as BYK 301.

The coating composition was prepared by combining the ingredients listed together with mild agitation. The coating composition was spray applied onto a wood substrate at a wet film thickness of 1.25 mils and then baked for 25 minutes at 125° F. (51.6° C.). All evaluations were performed seven days after curing:

Pencil Hardness: A measure of the coating's resistance to a pencil indentor. The scale ranges from 4B which indicates a relatively soft film to 10H which indicates a relatively hard film: 4B, 3B, 2B, B, HB, F, H, 2H, 3H . . . 10H.

Cold Check Resistance: This test is an indication of the coating's resistance to cracking upon exposure to extreme variations in temperature. The ability to withstand 10 cycles without cracking is a pass. One cycle is one hour in an oven at 120° F. (49° C.) then one hour in a freezer at −30° F. (−34° C.) then 30 minutes at room temperature.

QUV: The coated wood substrate was exposed to alternating cycles of humidity (4 hours at 50° C.) and ultraviolet light (8 hours at 70° C.). The panels were exposed for 48 hours and then examined for any change in color or surface appearance. The coated panel of this Example had HB hardness, good blocking resistance and color stability after QUV and passed the cold check resistance test.

EXAMPLE III

| Preparation of Water Dispersible Polyester Urethane-Acrylic Copolymer | | |
|---|---|---|
| Charge | Ingredients | Parts by Weight grams |
| I | polyester-urethane[6] | 466.7 |
| | ethylene glycol monobutyl ether | 59.8 |
| II | glycidyl methacrylate | 21.0 |
| | methyl methacrylate | 175.0 |
| | butyl methacrylate | 106.4 |
| | acrylic acid | 47.6 |
| | ethylene glycol monobutyl ether | 5.0 |
| III | tert-butyl perbenzoate | 35.0 |
| | ethylene glycol monobutyl ether | 105.0 |
| IV | tert-butyl perbenzoate | 3.5 |
| | ethylene glycol monobutyl ether | 30.0 |
| V | ethylene glycol monobutyl ether | 200.0 |

[6]This polyester urethane was prepared in the following manner:

| Charge | Ingredients | Parts by Weight grams |
|---|---|---|
| I | 2,2,4-trimethyl-1,3-pentanediol | 1407 |
| | 2,2-dimethylolpropionic acid | 337 |
| | adipic acid | 1349 |
| II | methyl ethyl ketone | 300 |
| III | isophorone diisocyanate | 300 |

A suitably equipped reactor vessel was placed under nitrogen atmosphere and charged with I. This material was heated to 350° F. (177° C.) and held for one hour. It was then heated to 410° F. (210° C.) and held until an acid number of 52 to 55 was achieved. The reaction mixture was also sampled for hydroxyl number. The reaction mixture was cooled to 180° F. (82° C.) and Charge II was added dropwise over a thirty minute period. The amount of Charge III added was based on the hydroxyl value determination. The reaction mixture was held at 180° F. to 200° F. (82° C. to 93° C.) until the disappearance of an NCO peak by infrared spectroscopy. The methyl ethyl ketone was then removed by distillation while adding ethylene glycol monobutyl ether.

The copolymer was prepared as follows.

A suitably equipped reactor vessel was charged with (I), placed under nitrogen atmosphere, and heated to a temperature of 130° C. Subsequently, Charges (II) and (III) were added together, (II) over a period of two hours and (III) over a period of two and one-half hours, respectively. Charge (V) was added during the addition of (II) and (III) to reduce the viscosity of the reaction mixture. The reaction mixture was maintained at 130° C. for one hour and then Charge (IV) was added over a period of thirty minutes. The reaction mixture was again held at 130° C. for one hour and then allowed to cool to room temperature. The resultant polyester urethane-acrylic copolymer had an acid value of 36.7.

EXAMPLE IV

The water dispersible copolymer of Example III was formulated into a coating composition and evaluated as set out below.

| Ingredients | Parts by Weight (grams) |
|---|---|
| acrylic paste[7] | 143.8 |
| copolymer of Example III | 122.0 |
| N,N—dimethylethanolamine | 8.3 |
| deionized water | 25.0 |
| RESIMENE 747[8] | 20.0 |
| dinonylnapthalenedisulfonic acid | 0.1 |
| ethylene glycol monobutyl ether | 0.9 |

[7]This paste was prepared in the following manner:

| Ingredients | Parts by Weight |
|---|---|
| acrylic resin[a] | 22.2 |
| deionized water | 14.1 |
| N,N—dimethylethanolamine | 2.6 |
| defoamer[b] | 0.5 |
| titanium dioxide | 100.0 |
| diethylene glycol monobutyl ether acetate | 4.4 |

[a]This water soluble acrylic is commercially available from Rohm and Haas as I-98.
[b]Commercially available from Drew Chemical as L-475.
[8]An alkylated melamine formaldehyde crosslinking agent commercially available from Monsanto.

The coating composition was applied onto an aluminum metal panel with a number 28 wirewound drawbar to a dry film thickness of 0.75 mils and cured by baking for 5 minutes at 350° F. (177° C.). The cured coating composition had a 60° gloss of 82 (determined using a Glossmeter); a pencil hardness of HB; and showed film removal after 40 double rubs with a methyl ethyl ketone soaked cloth.

EXAMPLE V A TO E

This group of Examples illustrates the importance of utilizing an acid group containing polymer which has an acid value greater than 10 mg KOH/g. Two different alkyds were utilized as the acid group containing polymer, one alkyd was prepared having acid numbers of 4.7 mg KOH/g and 22 mg KOH/g and a second alkyd was prepared at an acid number of 7.6 mg KOH/g. Alkyd-acrylic copolymers were then prepared utilizing these alkyds and the resultant copolymers applied and allowed to air dry into cured films.

The alkyd acrylic copolymers were prepared as detailed below:

| Copolymer A | | |
|---|---|---|
| Charge | Ingredients | Parts by Weight (grams) |
| I | alkyd[9] | 200.0 |
|   | methyl amyl ketone | 152.0 |
| II | glycidyl methacrylate | 100.0 |
|   | methyl methacrylate | 100.0 |
|   | methyl amyl ketone | 10.0 |
| III | tert-butyl perbenzoate | 8.0 |
|   | methyl amyl ketone | 110.0 |

[9]The alkyd was prepared at an acid value of 4.7 as follows:

| Ingredients | Parts by Weight (grams) |
|---|---|
| tall oil fatty acid | 3,500 |
| neopentyl glycol | 1,571 |
| trimethylolpropane | 756 |
| benzoic acid | 523 |
| maleic anhydride | 396 |
| isophthalic acid | 802 |
| dibutyltin oxide | 3.5 |

A reactor vessel equipped with mechanical stirrer, thermometer and nitrogen inlet tube was charged with all of the aforesaid ingredients and heated to a temperature of 350° F. (177° C.). The reaction mixture was held at this temperature for one hour and then the temperature was raised to 380° F. (193° C.) and held at this higher temperature for thirty minutes. Subsequently, the reaction mixture was heated to 400° F. (204° C.) and held at this temperature until an acid value less than 5 was achieved.

The copolymer was prepared by the following method:

A suitably equipped reactor vessel was charged with (I), placed under nitrogen atmosphere and heated to 130° C. Subsequently, Charges (II) and (III) were added together, (II) over a period of two hours and (III) over a period of two and one-half hours. The reaction mixture was held for two hours at 130° C. and then allowed to cool to room temperature. The resultant alkyd-acrylic copolymer had an acid value of less than one.

| Copolymer B | | |
|---|---|---|
| Charge | Ingredients | Parts by Weight (grams) |
| I | alkyd[10] | 200.0 |
|   | methyl amyl ketone | 152.0 |
| II | glycidyl methacrylate | 38.0 |
|   | methyl methacrylate | 162.0 |
|   | methyl amyl ketone | 10.0 |
| III | tert-butyl perbenzoate | 8.0 |
|   | methyl amyl ketone | 110.0 |

[10]This alkyd was prepared in the same manner and with the same ingredients as that in footnote [9] with the exception that is was prepared to an acid value of 22 mg KOH/g.

The alkyd-acrylic Copolymer B was prepared in the same manner as Copolymer A except that the resultant copolymer had an acid value of 3.7.

| Copolymer C | | |
|---|---|---|
| Charge | Ingredients | Parts by Weight (grams) |
| I | alkydl[11] | 256.0 |
|   | phenyl isocyanate | 8.3 |
| II | methyl amyl ketone | 240.0 |
| III | glycidyl methacrylate | 50.0 |
|   | methyl methacrylate | 214.2 |
|   | methyl amyl ketone | 10.0 |
| IV | tert-butyl perbenzoate | 10.5 |
|   | methyl amyl ketone | 110.0 |

[11]This alkyd is the same as that detailed in footnote [10], above.

The copolymer was prepared in the following manner.

A reactor vessel equipped with mechanical stirrer, thermometer and nitrogen inlet was charged with (I) and slowly heated to a temperature of 80° C. The reaction mixture was held at this temperature until analysis of a sample of the mixture by infrared spectroscopy indicated the absence of an isocyanate peak. Charge II was then added all at once, and the reaction mixture heated to 130° C. Subsequently, Charges (II) and (III) were added together, (II) over a period of two hours and (III) over a period of two and one-half hours. The reaction mixture was held for two hours at 130° C. and then allowed to cool to room temperature. The resultant copolymer had an acid value of 3.2

| Copolymer D | | |
|---|---|---|
| Charge | Ingredients | Parts by Weight (grams) |
| I | alkyd[12] | 700.0 |
|   | methyl amyl ketone | 741.0 |
| II | 2-hydroxyethyl acrylate | 350.0 |
|   | glycidyl methacrylate | 70.0 |
|   | butyl acrylate | 280.0 |
|   | methyl amyl ketone | 10.0 |
| III | tert-butyl perbenzoate | 70.0 |

-continued

| Copolymer D | | |
|---|---|---|
| Charge | Ingredients | Parts by Weight (grams) |
| | methyl amyl ketone | 40.0 |

[12]This alkyd is the same as that described in detail in footnote [10], above.

This copolymer was prepared as described above for A through C. The resultant copolymer had an acid value of 6.6.

| Copolymer E | | |
|---|---|---|
| Charge | Ingredients | Parts by Weight (grams) |
| I | alkyd[13] | 350.0 |
| | methyl amyl ketone | 360.0 |
| II | glycidyl methacrylate | 175.0 |
| | methyl methacrylate | 175.0 |
| | methyl amyl ketone | 10.0 |
| III | VAZO-67[14] | 21.0 |
| | methyl amyl ketone | 110.0 |

[13]The alkyd was prepared at an acid value of 7.6 as follows:

| Ingredients | Parts by Weight (grams) |
|---|---|
| tall oil fatty acid | 1,500 |
| neopentyl glycol | 593 |
| trimethylolpropane | 357 |
| maleic anhydride | 170 |
| isophthalic acid | 648 |
| dibutyltin oxide | 3 |

The alkyd was prepared as was detailed above in footnote [9].

[14]This free radical initiator is alpha,alpha'-dimethylazobis-(isobutyronitrile) and is commercially available from E. I. Dupont de Nemours.

This copolymer was prepared as described above for A through D.

Each of the copolymers detailed above was evaluated for the quality of the cured film which it produced as follows. Each copolymer was drawn down on a glass panel using a 3-mil drawbar and allowed to air dry for 24 hours. The appearance of the film was then observed and the results are set out below.

| Copolymer | Acid Value Mg KOH/g of alkyd reactant | Film Appearance |
|---|---|---|
| A | 4.7 | Hazy |
| B | 22.0 | Clear |
| C | 22.0 | Clear |
| D | 22.0 | Clear |
| E | 7.6 | Hazy |

The films resultant from copolymers prepared with an acid group containing polymer having an acid value of less than 10 mg KOH/g were hazy. It is believed this is indicative of a non-uniform composition and poor grafting. The films resultant from copolymers prepared with an acid group containing polymer having an acid value greater than 10 mg KOH/g were clear, indicating successful grafting and uniform composition.

EXAMPLE VI

This Example illustrates the importance of the presence of the epoxy group containing vinyl monomer. In this Example an alkyd acrylic copolymer was prepared first without epoxy group containing vinyl monomer and then with epoxy group containing vinyl monomer. The resultant copolymers were then evaluated as set out above for film appearance.

| Preparation of Copolymer Without Epoxy Containing Monomer | | |
|---|---|---|
| Charge | Ingredients | Parts by Weight (grams) |
| I | alkyd[15] | 200.0 |
| | methyl amyl ketone | 172.0 |
| II | methyl methacrylate | 200.0 |
| | methyl amyl ketone | 10.0 |
| III | tert-butyl perbenzoate | 8.0 |
| | methyl amyl ketone | 90.0 |

[15]This alkyd was prepared at an acid value of 22 in the following manner:

| Ingredients | Parts by Weight (grams) |
|---|---|
| coconut fatty acid | 1,457 |
| neopentyl glycol | 673 |
| trimethylolpropane | 395 |
| benzoic acid | 224 |
| maleic anhydride | 170 |
| isophthalic acid | 344 |
| dibutyltin oxide | 1.5 |

The alkyd was prepared according to the method described for the alkyd of footnote [9].

The alkyd-acrylic copolymer was prepared as has been described above for A through E of Example V. The resultant copolymer had an acid value of 6.6.

| Preparation of Copolymer Containing Epoxy Group Containing Monomer | | |
|---|---|---|
| Charge | Ingredients | Parts by Weight (grams) |
| I | alkyd[16] | 350.0 |
| | methyl amyl ketone | 356.0 |
| II | glycidyl methacrylate | 175.0 |
| | methyl methacrylate | 175.0 |
| | methyl amyl ketone | 10.0 |
| III | tert-butyl perbenzoate | 14.0 |
| | methyl amyl ketone | 110.0 |

[16]This alkyd is that described above in footnote [15].

The remainder of the preparative details are exactly as has been set out immediately above.

The copolymers were evaluated for the quality of the cured film as was described above in Example V. The resultant film of the copolymer prepared without epoxy group containing monomer was hazy, whereas the resultant film of the polymer containing epoxy group containing monomer was clear. As was stated above, it is believed that the film clarity is indicative of successful grafting.

EXAMPLE VII

| Preparation of Alkyd-Epoxy Functional Acrylic Copolymer | | |
|---|---|---|
| Charge | Ingredients | Parts by Weight (grams) |
| I | alkyd[17] | 282 |
| | DOWANOL PM[18] | 365 |
| II | glycidyl methacrylate | 256 |
| | methyl methacrylate | 200 |
| | butyl methacrylate | 104 |
| | DOWANOL PM | 10 |
| III | tert-butyl perbenzoate | 16 |
| | DOWANOL PM | 90 |
| IV | tert-butyl perbenzoate | 4 |

| | Preparation of Alkyd-Epoxy Functional Acrylic Copolymer | |
|---|---|---|
| Charge | Ingredients | Parts by Weight (grams) |
| | DOWANOL PM | 40 |

[17] This alkyd was prepared in the following manner:
A reactor vessel was equipped with mechanical stirrer, thermometer, and nitrogen inlet tube and set up for azeotropic reflux. The vessel was charged with 1500 parts by weight of coconut fatty acids; 833 parts by weight of trimethylolpropane; 450 partsby weight of benzoic acid; 470 parts by weight of phthalic anhydride and 90 parts by weight of xylene and heated to a temperature of 440° F. to 450° F. (227° C. to 232° C.) with reflux. The reaction mixture was held at this temperature until an acid value within the range of 20 to 24 was obtained. The reaction product was thinned to a total solids content of 85 percent. The final acid value was 22.4.
[18] This is commercially available from Dow Chemical and is the monomethylether of propylene glycol.

The copolymer was then prepared as follows:
A suitably equipped reactor vessel was charged with I, placed under nitrogen atmosphere and heated to a gentle reflux. Subsequently, charges (II) and (III) were added together, (II) over a period of two hours and (III) over a period of two and one-half hours. The reaction mixture was maintained at reflux for one hour and then charge IV was added over a period of thirty minutes. The reaction mixture was again maintained at reflux for one hour and then allowed to cool to room temperature. The resulting material had an epoxy equivalent of 830.

EXAMPLE VIII

In this Example the alkyd-epoxy functional acrylic copolymer of Example VII was formulated into a coating composition and evaluated.

| Ingredients | Parts by Weight (grams) |
|---|---|
| copolymer of Example VII | 16.6 |
| amine curing agent[19] | 3.1 |

[19] This was a trifunctional amine and is commercially available from Jefferson Chemical Company as JEFFAMINE T403.

The coating composition was drawn down on a glass panel using a 3-mil drawbar and baked for thirty minutes at 300° F. (149° C.). The appearance of the film was clear. The cured film had a pencil hardness of H to 2H and was able to withstand at least 50 double rubs with xylene and at least 25 double rubs with methyl isobutyl ketone without affecting the film appearance. The number of double rubs is understood to mean the number of back and forth finger rubs across the coating with a cloth dipped in the indicated solvent. The pencil hardness scale was described in Example II, above.

EXAMPLE IX

This Example illustrates the preparation of an alkyd-acrylic copolymer containing isobornyl methacrylate moieties. The copolymer was then formulated into a coating composition and evaluated for physical properties.

| Preparation of alkyd-acrylic copolymer | |
|---|---|
| Ingredients | Parts by Weight (grams) |
| alkyd[20] | 48.6 |
| methyl methacrylate | 19.4 |
| isobornyl methacrylate | 14.6 |
| butyl methacrylate | 9.7 |
| glycidyl methacrylate | 4.9 |
| phenyl isocyanate | 30.0 |
| tert-butyl perbenzoate | 2.4 |

| Preparation of alkyd-acrylic copolymer | |
|---|---|
| Ingredients | Parts by Weight (grams) |
| dibutyltin dilaurate | 0.12 |
| xylene | 100.0 |

[20] The alkyd was prepared as 85 percent solids in xylene from 33.8 percent linseed oil; 33.8 percent dehydrated castor oil; 15.1 percent phthalic anhydride; 10.7 percent pentaerythritol; 6.7 percent benzoic acid and 0.5 percent lithium naphthenate. The alkyd was prepared in a fashion similar to the other alkyds described in the previous Examples.

The copolymer was prepared as has been described above in Example I. It was then formulated into a coating composition as detailed below.

| Ingredients | Parts by Weight (grams) |
|---|---|
| alkyd-acrylic copolymer | 380.43 |
| aluminum pigment | 8.79 |
| drier composition[21] | 82.40 |

[21] This drier composition was prepared from 80 grams of a 0.48 percent silicone solution in xylene; 12 grams of an antiskin agent commercially available from Tenneco Chemicals as Guaiacol Special "C"; 200 grams of a mixture of 147.8 grams of cerium naphthenate, 24.65 grams of cobalt The coating composition was spray applied to a metal panel and allowed to air dry for 24 hours. The panel had a gloss of 74 as measured with a glossmeter (60°) after 24 hours and a gloss of 71 when measured after 7 days. The distinctness of image (DOI) was 15 after 24 hours and 15 after 7 days. A similar coating composition but without isobornyl methacrylate had a gloss of 53 after 24 hours and 53 after 7 days. The DOI was 0 after 24 hours and 0 after 7 days. The DOI is a measure of the film's clarity and it is measured with a "C"-box which is commercially available from I²R Company. To measure DOI a series of C's of different sizes are projected onto the surface of the coating being evaluated. Each size of C is given a numerical rating between 0 and 100 with 0 indicating that the coating has no reflective clarity to the opening part of the C and 100 indicating that the coating has maximum reflective clarity to the opening part of the C. The values in between indicate varying degrees of clarity.

What is claimed is:

1. A liquid, ungelled composition of matter which comprises a graft copolymer prepared by the free radical initiated vinyl addition polymerization in an organic medium of a vinyl monomer component which contains at least 0.5 weight percent of an epoxy group containing vinyl monomer in the presence of an acid group containing polymer having an acid value greater than 10 mg KOH/g, at least one means of graft formation being the condensation reaction between the acid groups of the acid group containing polymer and the epoxy groups of the vinyl monomer component.

2. The composition of claim 1 wherein the acid group containing polymer has an acid value of at least 15 mg KOH/g.

3. The composition of claim 1 wherein the acid group containing polymer is selected from oil-free saturated polyesters, oil-free unsaturated polyesters, urethane modified oil-free polyesters, and alkyds.

4. The composition of claim 1 wherein the epoxy group containing vinyl monomer is glycidyl methacrylate.

5. The composition of claim 1 wherein the vinyl monomer component contains from about 2 to about 100 weight percent of an epoxy group containing vinyl monomer.

6. The composition of claim 1 wherein a portion of the vinyl monomer component is isobornyl methacrylate.

7. The composition of claim 6 wherein the isobornyl methacrylate is present in an amount ranging from about 2 to about 25 percent by weight based on the total weight of vinyl monomer component.

8. A coating composition comprising the liquid, ungelled composition of claim 1.

9. The coating composition of claim 8 wherein the composition is thermoplastic.

10. The coating composition of claim 8 wherein the composition is thermosetting.

11. The coating composition of claim 8 wherein the composition is air oxidizable.

12. A liquid, ungelled composition of matter which is capable of being dispersed into water, comprising a graft copolymer prepared by the free radical initiated vinyl addition polymerization in an organic medium of a vinyl monomer component which contains at least 0.5 weight percent of an epoxy group containing vinyl monomer and at least a portion of an acid group containing vinyl monomer in the presence of an acid group containing polymer having an acid value greater than 10 mg KOH/g, at least one means of graft formation being the condensation between the acid groups of the acid group containing polymer and the epoxy groups of the vinyl monomer component, said reaction product having an acid number of at least 25.

13. The liquid, ungelled composition of claim 11 wherein the acid group containing vinyl monomer of the vinyl monomer component is acrylic acid or methacrylic acid.

14. The liquid ungelled composition of claim 11 wherein the vinyl monomer component contains from about 2 to about 100 weight percent of an epoxy group containing vinyl monomer.

15. The liquid, ungelled composition of claim 1 wherein the free radical initiated polymerization reaction product is epoxide functional.

16. A process for preparing a liquid ungelled composition of matter comprising a graft copolymer which comprises the free radical initiated vinyl addition polymerization in an organic medium of a vinyl monomer component which contains at least 0.5 weight percent of an epoxy group containing vinyl monomer in the presence of an acid group containing polymer having an acid value greater than 10 mg KOH/g, at least one means of graft formation being the condensation reaction between the acid groups of the acid group containing polymer and the epoxy groups of the vinyl monomer component.

17. The process of claim 16 wherein the acid group containing polymer has an acid value of at least 15 mg KOH/g.

18. The process of claim 16 wherein the epoxy group containing vinyl monomer is glycidyl methacrylate.

19. The process of claim 16 wherein the vinyl monomer component contains from about 2 to about 100 weight percent of an epoxy group containing vinyl monomer.

* * * * *